United States Patent [19]

Hahn, Jr.

[11] Patent Number: 4,728,680

[45] Date of Patent: Mar. 1, 1988

[54] PIGMENTED LOW TEMPERATURE CURE EMULSIONS

[75] Inventor: Kenneth G. Hahn, Jr., Hinckley, Ohio

[73] Assignee: The Glidden Company, Cleveland, Ohio

[21] Appl. No.: 943,794

[22] Filed: Dec. 19, 1986

Related U.S. Application Data

[63] Continuation-in-part of Ser. No. 824,241, Jan. 30, 1986, abandoned.

[51] Int. Cl.$^4$ ........................... C08J 3/08; C08L 61/00
[52] U.S. Cl. ...................................... 523/310; 524/512
[58] Field of Search .......................... 524/512; 523/310

[56] References Cited

U.S. PATENT DOCUMENTS

| | | | |
|---|---|---|---|
| 4,012,351 | 3/1977 | Hall et al. | 524/106 |
| 4,525,260 | 6/1985 | Abbey et al. | 524/555 |
| 4,540,735 | 9/1985 | Borovicka, Sr. | 524/555 |

*Primary Examiner*—Joseph L. Schofer
*Assistant Examiner*—N. Sarofin
*Attorney, Agent, or Firm*—Thomas M. Schmitz

[57] ABSTRACT

The composition comprises a cationic free, functional emulsion polymer mixture adapted to be coreacted with glycoluril. The process comprises copolymerizing ethylenically unsaturated monomers, including functional monomers but excluding amine monomers, in an aqueous polymerization medium. The resulting polymers are useful in surface coating application generally as well as specifically for wood substrates.

13 Claims, No Drawings

PIGMENTED LOW TEMPERATURE CURE EMULSIONS

This is a continuation-in-part of commonly assigned U.S. Ser. No. 824,241 filed Jan. 30, 1986, now abandoned the disclosure of said application incorporated herein by reference.

BACKGROUND OF THE INVENTION

This invention pertains to clear or pigmented emulsion coatings treated by cation exchange where the emulsion polymers contain hydroxyl or carboxyl groups but are free of amine groups. Said U.S. Ser. No. 824,241 describes a stable catalyst-free acrylic latex composition adapted to cure with amine-aldehyde and/or glycoluril curing agents. The stable reactive coating is based on ion-exchange of a water dispersed mixture of glycoluril resin and acrylic emulsion polymer, where the emulsion polymer contains carboxyl and/or hydroxyl groups but is free of amine groups.

Prior to this invention, glycoluril cured thermosetting emulsions were produced from non-ionic and acidic surfactants and generally required high levels of such surfactants. Anionic salt surfactants cause a detriment to the curing reaction. Further, pigmentation of such glycoluril and emulsion mixtures caused undesirable flocculation during the pigment grind step and subsequent let-down to produce pigmented mixtures.

Prior art U.S. Pat. Nos. 4,442,257 and 4,444,941 teach the use of certain acrylic latexes crosslinked with either tetramenthylol glycoluril (TMGU) or dihydroxy dimethylol ethylene urea (DDEU) for low-temperature curing coatings. Rapid cure is achieved with these products by adding from 1.5% to 3.5% by weight of a 40% solution of paratoluene sulfonic acid where a package pH of about 1.0 to 2.0 results. Stability of these catalyzed products ordinarily is limited to 1-5 days at room temperature, and much less at elevated temperatures. Hence, the acid catalyst must be added at the time of use, which can be dangerous since the acid is quite corrosive. Cured films of such polymer mixture often exhibit certain water sensitivity due to residual catalyst in the cured films. Without the catalyst, however, the coating has no solvent or water resistance unless baked at extremely high temperatures.

Abbey (U.S. Pat. No. 4,525,260) discloses a cationic latex for cathodic electrocoating and specifically includes amine monomers. The reference latex is based on acrylic monomers copolymerized with amine monomers, such as N,N-dimethyl-2-aminoethyl methacrylate, and catalyzed with an azo catalyst. Abbey subsequently treats the cationic latex with an ion exchange resin but to specifically remove amino monomers and amino initiator fragments. Hence, the reference is specifically directed to removing amino fragments introduced in the emulsion process. As noted below, amine latexes are not operative in this invention in that amine groups block coreactivity with a glycoluril cross-linker and inhibit the cure.

It now has been found that stable clear and pigmented emulsion dispersions containing glycoluril-type cross-linkers can be produced by using conventional surfactants, where the mixture is subsequently subjected to cationic exchange to remove the cations from the anionic surfactant as well as from other sources. The emulsion polymer specifically contains hydroxyl and/or carboxyl groups but not amine groups. Amine groups block reactivity, inhibiting cure and render the process of this invention inoperative. In accordance with this invention, the resulting cationic exchange step produces a clear emulsion mixture adapted to cure without the addition of acid catalysts such as p-toluenesulfonic acid. Hence, the disadvantages associated with the use of external acid catalysts are overcome by this invention. Dynamic mechanical analysis further demonstrates that the cure achieved by ion exchange is faster than by acid catalysis. The pigmented or clear mixtures exhibit excellent uninhibited cure with long-term viscosity stability. Accordingly, basic conventional surfactants used as the dispersant enables a dilatent free grind in producing the pigmented emulsion. Upon cation exchange treatment of the glycoluril and emulsion polymer dispersion, the mixture is stable against settling and exhibits no flocculation. In accordance with this invention, the ion-exchange process utilizes a proton-substituted cation exchange resin to remove cations rather than use detrimental external acid catalysts to effect the crosslinking reaction. This process unexpectedly yields a liquid coating with longterm package stability as compared with the acid-catalyzed liquid coating which reacts quickly but typically destabilizes and gels in 1-5 days at room temperature. The improved clear or pigmented emulsion coatings of this invention are indefinitely stable at room temperature yet, upon drying, cure at room temperature to give a fully crosslinked film.

SUMMARY OF THE INVENTION

Briefly, the invention pertains to a stabilized clear or pigmented aqueous dispersion suitable for coating or primer coating of wood which comprises, water, one or more acrylic or acrylic-modified binder latexes, and a crosslinking agent adapted to cure with said binder latexes. The acrylic emulsion polymer contains hydroxyls or carboxyls but is free of amine groups. The composition is produced by first compounding the glycoluril and emulsion polymer dispersion and then treating the same with an ion exchange resin, preferably a cation exchange resin, individually or together, to provide coatings having superior storage stability and which cure without the addition of acid cure catalyst. The present invention provides a stable clear or pigmented coating which, when dried at room temperature or heated in a baking oven, reacts to form a crosslinked film with good performance properties.

DETAILED DESCRIPTION OF THE INVENTION

In accordance with this invention, a post ion-exchange treatment of aqueous dispersions of glycoluril and emulsion polymer is affected to remove cations from the dispersions. Post ion-exchange treatment is best effected with protonated cation exchange resin. Protonated cation exchange resin typically comprises crosslinked macroreticular polystyrene beads having sulfonic acid surface groups, that is, the beads have a sulfonated surface. Bead sizes are typically about 1 millimeter in diameter more or less. In the present invention, the coating is not externally catalyzed, but is brought into intimate contact with a protonated cation exchange resin, such as Amberlite 200 CH from Rohm and Haas. This contact can be effected by adding from 1%-100% by weight of the exchange resin to the coating with agitation and mixing until the pH has stabilized below 2.5, and typically around 1.2-1.8. The mixture can be strained through a filter medium such as linen cloth of a size small enough to remove all of the solid exchange resin, whereby the filtered coating exhibits no changes in pH or viscosity over 3 months or longer. Optionally, the coating can be passed over a column bed of the exchange resin at a rate which yields a coating pH of less than 2.5, preferably around 1.2–1.8. Again, no change in stability or in pH or viscosity is apparent over a 3-month period.

Referring to the reactive emulsion polymer, the reactive polymer contains reactive hydroxyl, carboxyl, or acrylamide groups, but is free of amine groups. The emulsion polymer comprises copolymerized ethylenically unsaturated monomers including at least about 2% copolymerized reactive monomers of acrylamide, carboxyl monomer, or hydroxyl monomer. The acrylamide monomers can be acrylamide, methacrylamide, ethyacrylamide; and similar alkyl acrylamide and methacrylamide monomers including for example, N-methylol acrylamide, N-ethanol acrylamide, N-propanol acrylamide, N-methylol methacrylamide, N-ethanol methacrylamide, and similar acrylamide and methacrylamide monomers. Carboxyl containing monomers are ethylenically unsaturated monomers containing carboxyl groups, including lower alkyl acrylate or methacrylate monomers such as acrylic, methacrylic, or ethacrylic acid. Other useful carboxyl reactants include itaconic, citriconic, fumaric, maleic, mesaconic and aconitric acids. The preferred acids are acrylic and methacrylic acids. Hydroxyl containing monomers are ethylenically unsaturated monomers containing a hydroxyl group and can include for example, hydroxy alkyl acrylates or methacrylates such as hydroxyethyl, hydroxypropyl, hydroxybutyl, hydroxyhexyl, hydroxyoctyl and similar lower alkyl hydroxy acrylates and methacrylates. Ethylenically unsaturated monomers other than acrylamide, carboxyl, and hydroxyl monomers can include vinyl unsaturated monomers containing vinyl double bond unsaturation including, for example, vinyl esters such as vinyl acetate, vinyl propionate, vinyl butyrates, vinyl bensoate, isopropenyl acetate and like vinyl esters; vinyl amides, such as acrylamide and methacrylamide; and vinyl halides such as vinyl chloride. Ethylenically unsaturated monomers other than vinyl unsaturated monomers can include, for example, styrene, methyl styrenes and similar alkyl styrenes, chlorostyrene, vinyl toluene, vinyl naphtalene, divinyl benzene, diallyl phthalate and similar diallyl derivatives, butadiene, alkyl esters of acrylic and methacrylic acid and similar ethylenically unsaturated monomers. Acrylic unsaturated monomers include alkyl esters of acrylic or methacrylic acid having an alkyl ester portion containing between 1 to 12 carbon atoms as well as aromatic derivatives of acrylic and methacrylic acid, and can include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids. The ethylenically unsaturated monomers can be copolymerized by free radical induced addition polymerization using peroxy catalyst, common redox catalyst, ultraviolet radiation, or the like.

Preferred latex binders for this invention are acrylic or modified acrylic binders such as set forth in U.S. Pat. No. 4,444,941 and U.S. Pat. No. 4,442,257, provided the emulsion polymer is free of amine groups. A preferred emulsion polymer free of amine groups preferably comprises by weight between 20% and 95% acrylate or methacrylate monomers, 0% and 20% functional monomer selected from a carboxyl monomer, a hydroxyl monomer, or acrylamide monomer, or mixtures of such functional monomers, and 0% to 50% other ethylenically unsaturated monomer. A preferred emulsion polymer comprises a latex polymer consisting of copolymerized monomers of 20%–50% methy methacrylate, 0%–20% ethyl acrylate, 20%–50% butyl acrylate, and 1%–20% of a hydroxyl-bearing monomer.

The reactive emulsion polymer containing reactive hydroxyl, carboxyl, or acrylamide groups can be cross-linked by reaction with a glycoluril derivative. Glycoluril derivatives are disclosed in U.S. Pat. No. 4,064,191 and are also known as acetyleneureas. Glycolurils are derived by reacting two moles of urea with one mole of glyoxal to provide a complex ring structure as shown in U.S. Pat. No. 4,540,735; where substitute constituents can be a hydrogen, or a lower alkyl radical, or can be methylolated partially or fully by reacting with 1 to 4 moles of formaldehyde to provide a methylol glycoluril. The preparation of various glycolurils are illustrated in U.S. Pat. No. 4,064,191 such as tetramethylol glycoluril, tetrabutoxymethyl glycoluril, partially methyolated glycoluril, tetramethoxymethyl glycoluril, and dimethyoxydiethoxy glycoluril. Useful glycoluril derivatives include for example, mono- and dimethylether of dimethylol glycoluril, the trimethylether of tetramethylol glycoluril, the tetramethylether of tetramethylol glycoluril, tetrakisethoxymethyl glycoluril, tetrakisopropoxymethyl glycoluril, tetrakisbutoxymethyl glycoluril, tetrakisamyloxymethyl glycoluril, tetrakishexoxymethyl glycoluril and the like. Glycoluril derivatives can further include dimethylol dihydroxyl ethylene urea which is believed to have the chemical structure as follows:

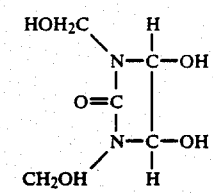

In practice, the ethylenic monomers can be polymerized in an aqueous medium at a pH preferably between about 1.0 and 6 to form a reactive emulsion polymer. Generally, the polymerization is conducted at a temperature of about 20°–100° C. in the presence of a free radical generating initiator. Commonly used free radical initiators include various peroxygen compounds such as the persulfates, benzoyl peroxide, t-butyl hydroperoxide, cumene hydroperoxide, di-t-butyl perphthalate, pelargonyl peroxide and 1-hydroxycyclohexyl hydroperoxide. Particularly preferred as polymerization initiators are the water-soluble peroxygen compound such as hydrogen peroxide and the sodium, potassium and ammonium persulfates used by themselves or in activated "redox" type systems. Typical "redox" systems include alkali metal persulfates with a reducing substance such as a polyhydroxy phenol. The amount of initiator used will generally be in the range between about 0.1 to 3% by weight based on the monomers and preferably is maintained between 0.15 and 1% by weight of the monomers. Usually the initiator will all be charged at the outset of the polymerization; however, incremental addition or proportioning of the initiator is often employed.

Emulsifiers used to prepare the latices of this invention are the general types of anionic and non-ionic emulsifiers. Exemplary anionic emulsifiers which may be employed are: alkali metal or ammonium salts of the sulfates of alcohols having from 8 to 18 carbon atoms, such as sodium lauryl sulfate, ethanol-amine lauryl sulfate, ethylamide lauryl sulfate; alkyli metal and ammonium salts of sulfonated petroleum or paraffin oils, sodium salts of aromatic sulfonic acids, such as dodecane-1-sulfonic acid and octadiene-1-sulfonic acid; aralkylsulfonates such as sodium isopropyl benzene sulfonate, sodium dodecyl benzene sulfonate and sodium isobutyl naphthalene sulfonate; alkali metal and ammonium salts of sulfonated dicarboxylic acid esters such as sodium dioctyl sulfosuccinate, disodium N-octadecylsulfosuccinamate; alkali metal or ammonium salts of free acids of complex organic mono- and diphosphate esters and the like. So-called non-ionic emulsifiers such as octyl- or nonylphenyl polyethoxyethanol and the like may also be used.

The amount of emulsifier used can be from about 0.01 to 6% or more by weight of the monomers. All of the emulsifier may be added at the beginning of the polymerization or may be added incrementally or by proportioning throughout the run. Typical polymerizations for the preparation of the emulsion polymers of this invention are conducted by charging the monomers into the polymerization reactor which contains water and a portion of the emulsifying agent. The reactor and its contents are heated and the initiator added.

A coating is prepared by blending from about 20 to 95 parts of emulsion polymer with from about 5 to 80 parts of one of the aforementioned crosslinkers, preferably about 70 to 95 parts of emulsion polymer with about 5 to 30 parts of crosslinker. The polymeric mixture of this invention advantageously avoids the problems associated with prior art coatings catalyzed with 1-4% of 40% paratoluene sulfonic acid. Stability of such prior art mixtures was limited to about 1-5 days in the best of cases, and, with many latex blends agglomeration occured within seconds of catalysis.

In accordance with this invention, a very clear coating or uniform dispersion of pigments can be obtained, using conventional anionic and nonionic surfactants, whereupon cations are subsequently removed by batch exchanging with Amberlite 200 CH resin, lowering the pH to less than 2.0. This dispersion is stable and shows no flocculation when combined with ion-exchanged glycoluril or aminoplast. Accordingly, a stable dispersion can be made using conventional surfactants which subsequently can be acidified by cation exchange to provide compatibility and stability in let down steps and pigment grinds if desired. Conventional basic surfactant can be used as the dispersant to enable a dilatent-free pigment grind. Cation exchange prevents settling and flocculation and further prevents cure inhibition in the final paint.

The following examples, wherein percentages are by weight, further illustrate the merits of this invention.

The following Examples 1–8 are clear coatings.

EXAMPLE 1

(a)

Latex

An emulsion polymer was produced from the following components:

| | Grams |
|---|---|
| Deionized Water | 85.6 |
| Sodium Dihexyl Sulfosuccinate | 0.5 |
| Potassium Carbonate | 0.136 |
| Ammonium Persulfate | 0.273 |
| Sodium Bis-tridecyl Sulfosuccinate | 0.319 |
| Butyl Acrylate | 39.0 |
| Methyl Methacrylate | 39.0 |
| N—isobutoxymethylol Acrylamide | 12.0 |
| 2-hydroxyethyl Acrylate | 6.0 |
| Glacial Methacrylic Acid | 4.0 |
| Sodium Formaldehyde Sulfoxilate | 0.180 |
| Tertiary Butyl Hydroperoxide | 0.012 |

The emulsion polymer is prepared as follows. The monomers are polymerized in a conventional reactor using a standard procedure of metering in the main body of monomer into the heated water plus surfactant and potassium carbonate over 2- to 5-hour intervals. Batch loading of monomer is possible but not preferred. Changing the monomer composition during the feed is also possible and may lead to faster cure and/or cleaner batches. The reaction is run at 60°–86° C. The sodium formaldehyde sulfoxilate and t-butyl hydroperoxide are added after the main body of monomers have been polymerized in order that traces of free monomers are reacted. The emulsion polymer latex is particularly suitable as a binder system for a paint composition. The latex has an N.V. content of 52% by weight; a density of 8.9 lb./gallon; and has a pH of 3.1.

(b) Clear Coating. The foregoing latex (a) can be utilized to produce a useful paint composition which can be applied to a substrate and cured at low temperatures such as 10 minutes at 120° F., or an oven bake and/or infrared heat to achieve a substrate surface temperature of from about 100° F. to about 260° F. A typical paint composition is as follows:

| | Grams |
|---|---|
| Latex (a) | 666 |
| Cymel 1175[1] | 175 |
| Foamaster O (defoamer)[2] | 1 |
| Isopropanol | 34 |
| Butyl Cellosolve[3] | 20 |

[1]Dihydroxy dimethylol ethylene urea, 45% N.V.(American Cyanamid Company).
[2]Diamond Shamrock Corporation.
[3]Union Carbide Corporation.

This coating with a pH of 4.2 was used as control without further cure additives.

EXAMPLE 2

Two hundred grams of the coating of Example 1 were combined with 7.0 grams of 40% paratoluene sulfonic acid in isopropanol. The product exhibited a pH of 1.1.

EXAMPLE 3

While mixing the coating of Example 1, 200 grams thereof were combined with 100 grams Amberlite 200 CH (macroreticular, strongly acidic, cation exchange resin from Rohm and Haas Corporation). After stirring for 30 minutes, the coating was strained through linen cloth to remove the cation exchange resin. The product had a pH of 1.5.

EXAMPLE 4

Three mil wet films of coatings Examples 1, 2, and 3 were cast on glass substrate and baked under various conditions to profile relative cure properties. The results are shown in Table I.

TABLE 1

Comparative Cure Tests

| Test | Cure Time/°F. | Example 1 | Example 2 | Example 3 |
|---|---|---|---|---|
| MEK rubs | 2 min./330° | 80 | >200 | >200 |
| Water spot | | 75 seconds, dissolved | 15 minutes, no effect | 15 minutes, no effect |
| MEK rubs | 30 sec./350° | 8 | 200, softens | 200, softens |
| H₂O spot | | 15 seconds, dissolved | 15 minutes, slight softening | 15 minutes, slight softening |
| MEK rubs | (a) | — | 50 | 80 |
| H₂O spot | | | 3 minutes, softened | 3 minutes, softened |

(a) Cast films exposed to low-intensity electric infrared for 90 seconds to full dry (panel temperature 130° F.). Panels were cooled seven minutes before testing.

EXAMPLE 5

Product Stability Tests

Samples of Example 2 and Example 3 products were placed in closed vials in a 140° F. oven to measure package stability. Example 2 product gelled in about 30 minutes and was discarded. Example 3 product remained liquid after 11 days and showed cure equivalent to the unaged sample.

Viscosity Stability

Viscosities were determined using a Brookfield LVT viscosimeter, #4 spindle, at 30 RPM.

| | Example 2 (cps) | Example 3 (cps) |
|---|---|---|
| Initial viscosity | 7,200 | 4,200 |
| 20 Hours at 72° F. | 18,800 | 4,500 |

Solvent Resistance on Hardboard

Two mil wet films of Example 2 and Example 3 products were cast on smooth, medium-density hardboard and exposed to high-intensity electric infrared heat for 60 seconds. Surface temperature reached about 160° F. On cooling both coatings were hard and tough and both exhibited >100 MEK rubs of solvent resistance.

EXAMPLE 6

A ½-gallon sample of coating (a) of Example 1 was prepared.

A one-inch diameter glass column, 12 inches in height, was packed with the Amberlite 200 CH cation exchange resin and fitted with feed and exit lines to allow the coating to enter from the bottom, diffuse through the packed resin beads, and exit from the top to a receiving chamber.

The coating was propelled through the system by air pressure in a feed vessel. Flow rate was regulated by the air pressure. The coating was run through the cation exchange column at a flow rate of 6 cc/minute. Inlet pH was 4.2; outlet pH was 1.5.

Samples of this coating and acid-catalyzed control were cast on smooth, medium-density hardboard to a dry film thickness of 1.5 mils. They were baked to a final cure temperature of 300° F. with electric infrared.

The coated boards were tested for water vapor transmission.

| | Water Vapor Permeance* |
|---|---|
| Control | 4.3 |
| Example 6 | 4.2 |

*Grains water/hour/square foot/inch Hg differential pressure.

Although the panel of Example 6 and the control gave identical water protection, the control showed excessive viscosity buildup.

EXAMPLE 7

A sample of coating (a) of Example 6 was allowed to age 37 days at room temperature.

0.5–0.7 mil dry films were cast on Leneta paper and placed in baking ovens at 100° F. and 120° F. for 13 minutes. Cure by MEK rubs was measured immediately and after ½ hour and one hour of post-bake aging.

| Oven Temp. | Initial MEK Rubs | ½ Hour Aged MEK Rubs | 1 Hour Aged MEK Rubs | 15 Min. Aged H₂O Spot |
|---|---|---|---|---|
| 100° F. | 40–50 | 50 | 50 | 15 softens |
| 120° F. | 60–75 | 100 | 100 | 15 softens |

Another sample of coating (a) of Example 6 aged 37 days was brushapplied to a piece of smooth, medium-density hardboard and allowed to dry at room temperature (approximately 72° F., 50% R.H.). Film thickness was estimated to average 1.5 mils.

| Time After Brush-Out | MEK Rubs |
|---|---|
| 1 Hour (completely dry) | 5 |
| 4 hours | 12 |
| 19 hours | 35 |
| 24 hours | 45 |
| 43 hours | 45 |
| 67 hours | 45 |
| 9 Days | 50 |
| 17 Days | 125 |

This demonstrates the ability of this system to achieve room temperature cure although stable in the liquid form at the same temperature.

EXAMPLE 8

A modified acrylic latex was prepared in a manner similar to Example 3 using N-methylol acrylamide in place of methacrylic acid. When tested against a control having no catalyst and a control using added p-toluene sulfonic acid catalyst, the coating that was treated with cation exchange resin gave greater package stability and physical characteristics at least equivalent to the identical latex having added catalyst.

EXAMPLE 9

A dispersion was made as follows:

|  | Grams |
| --- | --- |
| D.I. H$_2$O | 150 |
| Aerosol 22-S surfactant | 9.35 (American Cyanamid) |
| Triton X-405 surfactant | 1.96 (Rohm & Haas) |
| Defoamer 357 | 0.34 (Hercules, Inc.) |
| Zopaque RCL-9 | 150 (SCM Corp.) |
| Neosil A Cryptocrystalline silica | 525 (Tammsco, Inc.) |
| YLD-2288-D Monohydrate ferric oxide | 5 (Pfizer Minerals) |

A Hegman 4-5 grind was obtained after 10 minutes of dispersion. 1.0 gram of Triton X-405 was added to 110 grams of the above grind, and to this is added 30 grams of Amberlite 200 CH (with mixing) and mixed about 30 minutes. After filtering, the pH is 2.10.

To 59 grams of previously cation-exchanged sealer (pH 1.6) was added 78 grams of the above grind. The resulting paint was smooth and showed no flocculation. It was tested by drawdown with a 3 mil bird coater on glass and baked 2 minutes with electric infrared to a surface temperature of 200° F. As soon as cool, it exhibited 71 MEK rubs to break through to substrate, and a 5 minute water spot showed no effect.

The degree of smoothness of this coating and the ability to develop full cure without catalysis were significant. The exchanged paint was stable at 130° F. for over 96 hours.

EXAMPLE 10

A dispersion was made as follows:

A 1-liter stainless steel dispersion pot (10 cm diameter) was fitted with a 4.5 cm high speed dispersion blade.

The following were added, in order, with low speed mixing:

|  | Grams |
| --- | --- |
| Deionized water | 150 |
| [1]Aerosol 22 surfactant | 9.35 |
| [2]Triton X-405 surfactant | 1.86 |
| [3]Defoamer 357 | 0.34 |

After the above were added, agitation was increased to medium speed and the following were added.

| TiO$_2$ | 150 |
| --- | --- |
| [4]Neosil A Cryptocrystalline Silica | 525.0 |

Agitation was increased to high speed with about 50% of the silica added.

| [5]YLD-2288-D Monohydrate ferric oxide | 5.0 |
| --- | --- |

[1]American Cyanamid
[2]Rohm & Haas
[3]Hercules, Inc.
[4]Tammsco, Inc., Tamma, IL.
[5]Pfier Minerals With everything added, high-speed dispersion was maintained for 5 minutes. A Hegman gauge dispersion of 4.5 was obtained. The dispersion blade was removed, and the dispersion was covered and set aside for later use. The pH of this dispersion was 7.7.

EXAMPLE 11

A 550-gram sample of grind of Example 10 was put in a 1000 cc beaker fitted with a mixing blade. Under slow agitation, 5.0 grams of Triton X-405 was added and mixed for 5 minutes.

Then 150 grams of Amberlite 200 CH cation exchange resin (Rohm & Haas Co.) was added, and mixed 30 minutes. The mixture was filtered though a coarse filter cone to remove the granular cation exchange resin.

The filtered dispersion had a pH of 2.10 and was set aside for later use.

EXAMPLE 12

(a) Latex. An emulsion polymer was produced from the following components:

|  | Grams |
| --- | --- |
| Deionized Water | 85.6 |
| Sodium Dihexyl Sulfosuccinate | 0.5 |
| Potassium Carbonate | 0.136 |
| Ammonium Persulfate | 0.273 |
| Sodium Bis-tridecyl Sulfosuccinate | 0.319 |
| Butyl Acrylate | 39.0 |
| Methyl Methacrylate | 39.0 |
| N—isobutoxymethylol Acrylamide | 12.0 |
| 2-hydroxyethyl Acrylate | 6.0 |
| Glacial Methacrylic Acid | 4.0 |
| Sodium Formaldehyde Sulfoxilate | 0.180 |
| Tertiary Butyl Hydroperoxide | 0.012 |

The emulsion polymer is prepared as follows. The monomers are polymerized in a conventional reactor using a standard procedure of metering in the main body of monomer into the heated water plus surfactant and potassium carbonate over 2- to 5-hour intervals. Batch loading of monomer is possible but not preferred. Changing the monomer composition during the feed is also possible and may lead to fasster cure and/or cleaner batches. The reaction is run at 60°–86° C. The sodium formaldedhyde sulfoxilate and t-butyl hydroperoxide are added after the main body of monomers have been polymerized in order that traces of free monomers are reacted. The emulsion polymer latex is particularly suitable as a binder system for a paint composition. The latex has an N.V. content of 52% by weight, has a density of 8.9 lb/gallon and a pH of 3.1.

(b)

Clear coating.

A clear coating was prepared from the above latex by combining in order with mixing, the following:

|  | Grams |
| --- | --- |
| Latex (a) | 666 |
| Cymel 1175[1] | 175 |
| Foamaster[2] O | 1 |
| Isopropanol | 34 |
| Butyl Cellosolve[3] | 20 |

[1]Dihydroxy dimethylol ethylene urea, 45% N.V. (American Cyanamid Company).
[2]Diamond Shamrock Corporation.
[3]Union Carbide Corporation This clear coating, with a pH of 4.2, was set aside for later use.

EXAMPLE 13

With mixing 200 grams of the clear coating of Example 12 were combined with 100 grams Amberlite 200 CH (macroreticular, strongly acidic cation exchange resin from Rohm & Haas Corporation). After stirring for 30 minutes, the coating was strained through linen cloth to remove the cation exchange resin. The product had a pH of 1.5.

The clear coating was set aside for later use.

EXAMPLE 14

The following coatings were prepared.

|  | A | B | C |
|---|---|---|---|
| Dispersion of Ex. 10 | 156.0 |  | 156.0 |
| Dispersion of Ex. 11 |  | 156.0 |  |
| Sealer of Ex. 12 | 118.0 |  | 118.0 |
| Sealer of Ex. 13 |  | 118.0 |  |
| 40% paratoluene sulfonic acid |  |  | 5.5 |
| pH of each coating was determined to be: | 6.2 | 1.8 | 1.5 |

Samples of each coating were applied by a 3-mil Bird applicator to smooth glass plates and dried under electric infrared heat for two minutes to achieve a surface temperaure of 225° F. as measured by an optical pyrometer. The test panels were then allowed to cool for 15 minutes and tested for solvent and water resistance.

|  | A | B | C |
|---|---|---|---|
| MEK rubs | 2 | 71 | 75 |
| 5 min. water spot | Dissolved, 30 seconds | No effect | Softens, can be pulled from glass. |

The ion exchanged paint "B" clearly exhibits superior water resistance to the acid catalyzed paint.

EXAMPLE 15

A dispersion was made as follows:

A 1-liter stainless steel dispersion pot (10 cm diameter) was fitted with a 4.5 cm. high speed dispersion blade.

The following were added, in order, with mixing:

|  | Grams |
|---|---|
| Deionized Water | 78.4 |
| [1]Foamaster O | 1.85 |
| [2]Gafac PE-510 surfactant | 7.86 |
| [3]Surfynol TG surfactant | 2.74 |
| [4]Zopaque RCL-9 TiO$_2$ | 91.5 |
| [5]#1 Barytes barium sulfate pigment | 43.2 |
| [6]Neosil A crypto crystalline silica | 366.1 |
| [7]Lampblack W-7017 | 1.21 |

[1]Diamond Shamrock Corp., Morristown, NJ
[2]GAF, New York, NY
[3]Air Products, Allentown, PA
[4]SCM Corp., New York, NY
[5]Pfizer Minerals, New York, NY
[6]Tammsco, Inc., Tamma, IL
[7]Harshaw Chemical Co., Cleveland, OH Dispersion was continued at high speed until a Hegman Grind of 4.5 or greater was obtained.

100 grams of this dispersion was added, with mixing, to 100 grams of the clear coating of Example 12. The pH of this paint was 4.9.

EXAMPLE 16

A surfactant solution was prepared by mixing in order as follows:

|  | Grams |
|---|---|
| Deionized Water | 90.0 |
| Gafac PE-510 | 5.0 |
| [1]Tergitol NP-40 surfactant | 5.0 |

[1]Union Carbide

The solution was stirred until completely dissolved.

3.3 grams of this solution was added to 200 grams of the coating of Example 15 with mixing. To this mixture was added 25.0 grams of Amberlite 200 CH ion exchange resin. This was mixed for 45 minutes until the pH stabilized at 1.65. The paint was filtered though a coarse filter cone to remove the Amberlite resin.

EXAMPLE 17

A sample of the paint of Example 16 was brush-applied to a piece of smooth hardboard and allowed to dry at room temperature, which ranged from 68° F. to 74° F. over the time of the test. The degree of cure was noted by checking MEK and water resistance from time to time.

| Elapsed Time After Coating | Tape Adhesion | MEK Rubs | H$_2$O Rubs |
|---|---|---|---|
| 1 hour | Bad | 4–5 | N.D. |
| 3 hours | Fair | 7 | N.D. |
| 19 hours | Good | 15 | 100 |
| 24 Hours | Good | 25 | N.D. |
| 43 hours | Good | 25–30 | N.D. |
| 67 hours | Good | 30 | 200 |
| 9 days | N.D. | 40 | N.D. |
| 17 days | Excellent | 70 | N.D. |

The liquid coating was still fluid after 17 days, whereas the applied film developed excellent cure at the same temperature.

EXAMPLE 18

A dispersion was made as follows:

One 1-liter stainless steel dispersion pot was fitted with a 4.5 cm high-speed dispersion blade. The following were added in order with mixing:

|  | Grams |
|---|---|
| Deionized Water | 73.05 |
| Foamaster O | 0.47 |
| Surfynol TG surfactant | 1.41 |
| Gafac PE 510 surfactant | 2.81 |
| [1]Polymist A-12 polyethylene wax | 72.3 |
| Deionized water | 35.6 |
| Isopropyl alcohol | 16.0 |
| [2]Silcron G-600 fumed silica | 22.9 |

[1]Allied Chemical, Morristown, NJ
[2]SCM Corp., New York, NY

This dispersion was added with mixing to 630 grams of the clear coating of Example 12. The pH was measured at 3.85. To a 450-gram sample of this flatted clear coating was added 78.0 grams of Amberlite 200 CH ion exchange resin and mixed for 15 minutes. The coating was filtered through a coarse filter cone to remove the Amberlite resin. The pH was 1.45.

Another sample of the coating was mixed with 3.5% by weight of a 40% solution of paratoluene sulfonic acid in isopropanol. The pH was 1.3.

Samples of both were applied to sealed Leneta paper with a 3-mil Bird applicator, and baked 2 minutes in a 250° F. oven. After cooling, both films exhibited over 40 MEK rubs. The samples were checked for stability at room temperature.

| Elapsed Time | pH | Physical Appearance | |
|---|---|---|---|
| | | Ion-exchanged | Catalyzed |
| 1 day | 1.45 | no change | pH 1.3, very viscous |
| 2 days | 1.45 | no change | too viscous to use-nearly gelled |
| 7 days | 1.45 | no change | |
| 7½ months | 2.16 | no change still exhibits 40–50 MEK rubs cure. | |

EXAMPLE 19

The following latex contains copolymerized amine monomer as follows.

| | Weight Parts |
|---|---|
| Di Water | 93.7 |
| Butyl acrylate | 16.1 |
| Methyl methacrylate | 27.3 |
| Hydroxypropyl methacrylate | 8.76 |
| Dimethyl Amino Ethyl Methacrylate | 0.20 |

The resulting amine functional latex was mixed with tetramethylol glycoluril on a 1.5/1.0 equivalent reaction group basis latex/glycoluril. The resulting composition was treated with ion exchange resin using Amerlite 2000H. For comparison the hydroxylated latex of Example 1 was combined with tetramethylol glycoluril and treated in the same manner. Film drawdowns were prepared and baked at 250° F. for 3 minutes, and the results were as follows.

I claim:

| | Ex. 1 | Ex. 19 |
|---|---|---|
| Waterspot | No effect | softens |
| MEK double rubs | 100 | 8 |

1. In a process for producing emulsion polymers by copolymerizing ethylenically unsaturated monomers in an aqueous polymerization medium, and in the presence of surfactants and initiators, the improvements comprising:
   copolymerizing ethylenically unsaturated monomers, including carboxyl or hydroxyl functional monomers, but excluding amine monomers, to produce a functionally reactive emulsion polymer; and treating the functional emulsion polymer with an ion exchange resin to remove cations from the functional emulsion polymer and produce a pH of less than 2.5, where said ion exchanged emulsion polymer is adapted to be crosslinked with glycoluril.

2. The process in claim 1 wherein the reactive emulsion polymer is mixed with a glycoluril derivative prior to the step of treating with an ion exchange resin.

3. The process in claim 1 wherein the ion exchange resin is a protonated cation exchange resin.

4. The process in claim 1 wherein glycoluril is treated separately with an ion exchange resin and thereafter mixed with the reactive emulsion polymer treated with the ion exchange resin.

5. A process for preparing a stable, aqueous latex sealer comprising water, one or more binder latexes, and a glycoluril crosslinking agent adapted to cure with said binder latexes, which comprises
   providing a latex sealer composition comprising by weight between 5% and 60% of a glycoluril crosslinking agent and between 40% and 95% of an emulsion polymer latex prepared in an aqueous medium and selected from the group consisting of acrylic, styrene acrylic, vinyl acetate, vinyl chloride and vinylidene chloride binder or mixtures thereof, said emulsion polymer having a reactive functionality selected from the group consisting of hydroxyl, carboxyl, amido or methylolamido adapted to react with said glycoluril crosslinking agent, said emulsion polymer free of amine groups; and
   treating said latex sealer composition with a protonated cation exchange agent to provide a latex coating having a pH of less than about 2.5, whereby said coating does not gel or destabilize at room temperature, but is heat curable at temperatures from about 60° F. to 350° F. without addition of acid cure catalyst.

6. The process of claim 5 wherein the latex comprises one or more binders selected from the group consisting of acrylic, styrene acrylic, vinyl acetate, vinyl chloride and vinylidene chloride and the exchange agent is a protonated cation exchange resin.

7. The process of claim 5 wherein the coating composition comprises an acrylic latex binder and the crosslinking agent is a methylolated glycoluril containing between 1 and 4 groups of methylol.

8. A process for preparing a stable, clear aqueous acrylic latex sealer comprising water, one or more binder latexes, and a glycoluril crosslinking agent adapted to cure with said binder latexes, which comprises
   providing a latex sealer composition comprising by weight between 5% and 60% of a glycoluril crosslinking agent and between 40% and 95% of an emulsion polymer comprising polymerized ethylenically unsaturated monomers on a weight basis of between 0% and 10% carboxylic monomer, 2% and 20% alkylhydroxy acrylate or methacrylate monomer, and the balance being other ethylenically unsaturated monomer comprising monomers selected from vinyl monomers, styrene monomers or acrylate monomers whereby said emulsion polymer contains reactive groups for crosslinking reaction with said crosslinking agent, and said emulsion polymer being free of amine groups; and
   treating said latex sealer with a cation exchange agent to provide a latex coating composition having a pH less than about 2.5, which does not gel or destabilize at room temperature, but is heat curable at temperatures from about 60° F. to 350° F. without addition of acid cure catalyst.

9. The process of claim 8 wherein the glycoluril comprises dihydroxy dimethyol ethylene urea.

10. The process of claim 8 wherein the latex sealer is an unpigmented sealer having a pH on the basic side which on treatment with the cation exchange agent is converted to an acid latex.

11. A coating composition substantially free of cations comprising by weight between 20% and 95% emulsion polymer and between 5% and 80% glycoluril, said emulsion polymer containing reactive hyroxy, carboxyl, or acrylamide groups adapted to be coreactive with glycoluril, where said emulsion polymer is free of amine groups, said composition produced by treating the coating composition with ion exchange resin to substantially remove the cations from the emulsion polymer and the glycoluril to reduce the pH of the coating composition to less than about 2.5.

12. The coating composition in claim 11 wherein the coating composition is pigmented.

13. The coating composition in claim 11 wherein the coating composition is clear.

* * * * *